United States Patent
Oe et al.

(10) Patent No.: US 12,235,122 B2
(45) Date of Patent: *Feb. 25, 2025

(54) VEHICLE FOR RECEIVING TRAVELING GUIDANCE THAT IS GENERATED BASED ON AN IMAGE OF A SPECIFIC POINT

(71) Applicant: TOYOTA JIDOSHA KABUSHIKI KAISHA, Toyota (JP)

(72) Inventors: Yoshihiro Oe, Kawasaki (JP); Kazuya Nishimura, Okazaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,649

(22) Filed: Aug. 22, 2023

(65) Prior Publication Data

US 2023/0392943 A1    Dec. 7, 2023

Related U.S. Application Data

(63) Continuation of application No. 17/506,747, filed on Oct. 21, 2021, now Pat. No. 11,774,258, which is a continuation of application No. 16/788,340, filed on Feb. 12, 2020, now Pat. No. 11,187,552.

(30) Foreign Application Priority Data

Mar. 15, 2019   (JP) .................. 2019-048578

(51) Int. Cl.
*G01C 21/36*   (2006.01)

(52) U.S. Cl.
CPC ................... *G01C 21/3647* (2013.01)

(58) Field of Classification Search
CPC ............ G01C 21/3647; G01C 21/3629; G08G 1/096811; G08G 1/096844; H04W 4/024; H04W 4/44

See application file for complete search history.

(56) References Cited

U.S. PATENT DOCUMENTS

| 11,187,552 B2 | 11/2021 | Oe |
| 11,774,258 B2 * | 10/2023 | Oe ..................... G01C 21/3629 701/431 |
| 2005/0171688 A1 | 8/2005 | Fujita |

(Continued)

FOREIGN PATENT DOCUMENTS

| CN | 103148861 A | 6/2013 |
| CN | 103270393 A | 8/2013 |

(Continued)

OTHER PUBLICATIONS

Aug. 4, 2021 Notice of Allowance issued in U.S. Appl. No. 16/788,340.

(Continued)

*Primary Examiner* — Maurice L. McDowell, Jr.
(74) *Attorney, Agent, or Firm* — Oliff PLC

(57) ABSTRACT

A vehicle includes a processor configured to receive information for traveling guidance, which is generated based on an image of a specific point. The image of the specific point is captured by another vehicle, and the specific point is a point at which a traveling route of a different vehicle deviates from a guidance route.

10 Claims, 4 Drawing Sheets

(56) References Cited

U.S. PATENT DOCUMENTS

| | | |
|---|---|---|
| 2006/0164412 A1 | 7/2006 | Dupont |
| 2009/0125229 A1 | 5/2009 | Peri et al. |
| 2011/0243379 A1 | 10/2011 | Miyajima et al. |
| 2013/0151144 A1 | 6/2013 | Cho |
| 2013/0245944 A1 | 9/2013 | Rutten et al. |
| 2013/0304382 A1 | 11/2013 | Nomoto et al. |
| 2014/0052370 A1* | 2/2014 | Watanabe .......... G01C 21/3641 701/428 |
| 2015/0211879 A1 | 7/2015 | Nomura |
| 2015/0228194 A1 | 8/2015 | Nomura |
| 2018/0259347 A1 | 9/2018 | Khasis |
| 2019/0061780 A1 | 2/2019 | Han et al. |

FOREIGN PATENT DOCUMENTS

| | | | |
|---|---|---|---|
| EP | 1614994 A1 * | 1/2006 | ......... G01C 21/3492 |
| JP | 2004-093444 A | 3/2004 | |
| JP | 2008-232938 A | 10/2008 | |
| JP | 2013-152587 A | 8/2013 | |
| JP | 2018-197699 A | 12/2018 | |
| WO | 2012/086137 A1 | 6/2012 | |

OTHER PUBLICATIONS

Mar. 23, 2023 Office Action Issued In U.S. Appl. No. 17/506,747.
Jul. 6, 2023 Notice of Allowance Issued in U.S. Appl. No. 17/506,747.

* cited by examiner

VEHICLE FOR RECEIVING TRAVELING GUIDANCE THAT IS GENERATED BASED ON AN IMAGE OF A SPECIFIC POINT

INCORPORATION BY REFERENCE

This is a Continuation of U.S. patent application Ser. No. 17/506,747 filed on Oct. 21, 2021, which is a Continuation of U.S. patent application Ser. No. 16/788,340 filed on Feb. 12, 2020, which claims the benefit of Japanese Patent Application No. 2019-048578 filed on Mar. 15, 2019. The disclosure of each of the prior applications is hereby incorporated by reference in entirety.

BACKGROUND

1. Technical Field

The disclosure relates to a server apparatus that processes information acquired from a vehicle and an information processing method.

2. Description of Related Art

In recent years, navigation devices that perform traveling guidance for vehicles are installed in a large number of vehicles. The navigation device displays various kinds of information for an improvement in convenience of a driver. Japanese Unexamined Patent Application Publication No. 2013-152587 (JP 2013-152587 A) discloses a moving object information processing system in which an imaging data obtained through an imaging operation performed by a vehicle-mounted camera is collected and the collected data is distributed to a vehicle. A navigation device of the vehicle displays a video of a road situation or the like based on the distributed data.

SUMMARY

There is a possibility that a driver mistakes a right turn point and cannot drive along a guidance route even though traveling guidance, in which notification about the right turn point on the guidance route is made, is performed by a navigation device of a vehicle. The present inventors have recognized that traveling guidance with which a driver is less likely to mistake a guidance route is desired in relation to a point where the traveling route of a vehicle deviates from a guidance route.

The disclosure provides a server apparatus and an information processing method with which it is possible to generate information for traveling guidance with which a driver is less likely to mistake a traveling route.

A first aspect of the disclosure relates to a server apparatus including a first acquisition unit, a specifying unit, a second acquisition unit, and a generation unit. The first acquisition unit is configured to acquire a specific point at which the traveling route of a vehicle deviates from a guidance route. The specifying unit is configured to specify a vehicle that has passed through the acquired specific point based on traveling route information of a plurality of vehicles. The second acquisition unit is configured to acquire, from the specified vehicle, an image of the specific point captured by the vehicle. The generation unit is configured to generate information for traveling guidance relating to the specific point based on the acquired image.

According to the aspect, since the image of the specific point at which the traveling route of the vehicle deviates from the guidance route is acquired, it is possible to generate, based on the image, new information for traveling guidance that is less likely to be mistaken by a driver.

In the server apparatus according to the first aspect, the generation unit may extract a marker to be used in traveling guidance from the acquired image of the specific point and generate the information for the traveling guidance including information relating to the extracted marker and the server apparatus may further include a provision unit configured to provide the generated information for the traveling guidance to the vehicles.

In the server apparatus according to the first aspect, the first acquisition unit may acquire a condition under which the traveling route deviates from the guidance route at the specific point and the specifying unit may specify a vehicle that has passed through the specific point and of which the traveling situation satisfies the condition.

A second aspect of the disclosure relates to an information processing method. The information processing method includes a first acquisition step of acquiring a specific point at which the traveling route of a vehicle deviates from a guidance route, a specifying step of specifying a vehicle that has passed through the specific point acquired in the first acquisition step based on traveling route information of a plurality of vehicles, a second acquisition step of acquiring, from the vehicle specified in the specifying step, an image of the specific point captured by the vehicle, and a generation step of generating information about traveling guidance relating to the specific point based on the image acquired in the second acquisition step.

According to the aspects of the disclosure, it is possible to generate information for traveling guidance with which a driver is less likely to mistake a traveling route.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
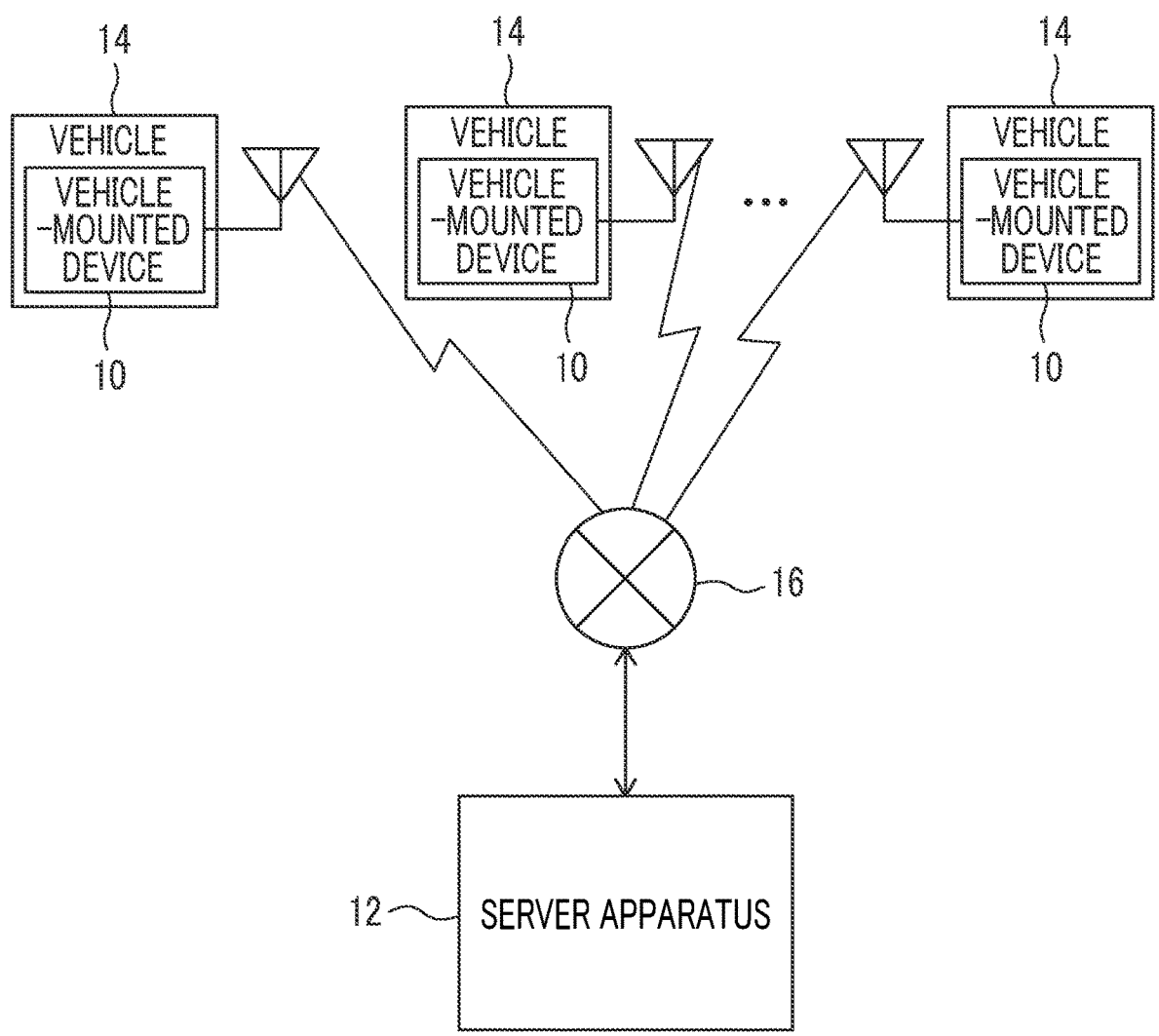
FIG. 1 is a block diagram illustrating the configuration of a vehicle system according to an embodiment.

FIG. 1 is a block diagram illustrating the configuration of a vehicle system 1 according to an embodiment. The vehicle system 1 is provided with a plurality of vehicle-mounted devices 10 and a server apparatus 12. FIG. 1 shows three vehicle-mounted devices 10 out of the vehicle-mounted devices 10.

The vehicle-mounted devices 10 are installed in vehicles 14, which are automobiles. The vehicle-mounted devices 10 have a wireless communication function and are connected to a network 16 via a wireless base station or a wireless access point. The server apparatus 12 is connected to the network 16 and the server apparatus 12 communicates with the vehicle-mounted devices 10 via the network 16. The server apparatus 12 is installed in, for example, a data center and functions as an information processing apparatus that processes information transmitted from the vehicle-mounted devices 10. The wireless communication standard is not particularly limited and examples thereof include 3G (third generation mobile communication system), 4G (fourth generation mobile communication system), and 5G (fifth generation mobile communication system).

Figure 2:
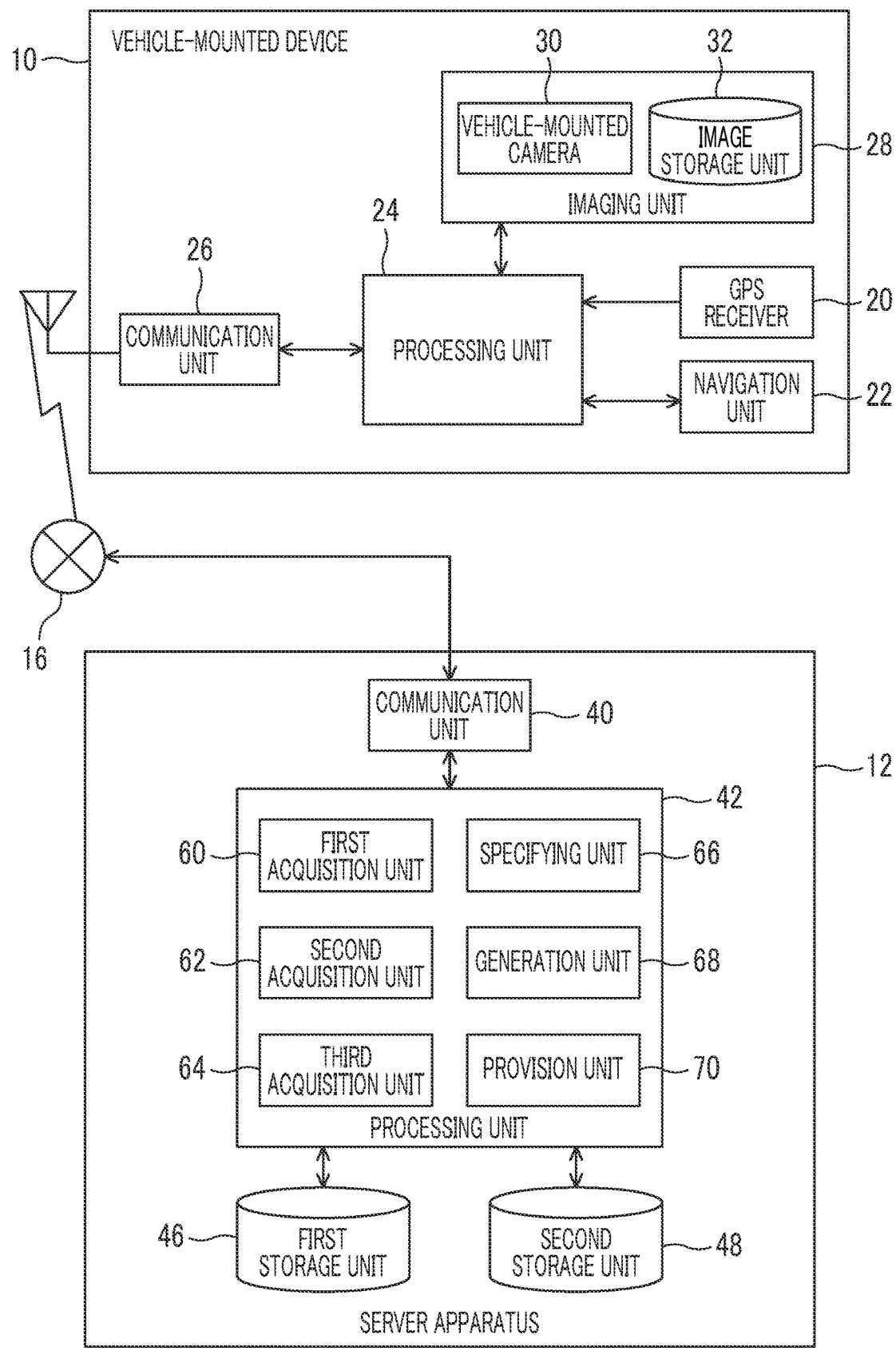
FIG. 2 is a block diagram illustrating the configurations of a vehicle-mounted device and a server apparatus shown in FIG. 1.

FIG. 2 is a block diagram illustrating the configurations of the vehicle-mounted device 10 and the server apparatus 12 shown in FIG. 1. The vehicle-mounted device 10 is provided with a GPS receiver 20, a navigation unit 22, a processing unit 24, a communication unit 26, and an imaging unit 28. The server apparatus 12 is provided with a communication unit 40, a processing unit 42, a first storage unit 46, and a second storage unit 48. The processing unit 42 is provided with a first acquisition unit 60, a second acquisition unit 62, a third acquisition unit 64, a specifying unit 66, a generation unit 68, and a provision unit 70.

In the vehicle-mounted device 10, the GPS receiver 20 periodically acquires position information of a host vehicle. The date and time of acquisition is attached to the position information.

The navigation unit 22 sets a guidance route for route guidance based on a departure point, a destination, map information, and the like, displays the guidance route and a map on a display unit (not shown), and performs traveling guidance in accordance with the guidance route by using at least one of an image and a voice.

The navigation unit 22 acquires the traveling route of the host vehicle based on the position information acquired by the GPS receiver 20 and the map information. The traveling route can also be called a traveling trajectory, along which the host vehicle has actually traveled, and includes the date and time of travel for each position on the traveling route. The navigation unit 22 outputs information about the guidance route and the traveling route to the processing unit 24.

The processing unit 24 transmits traveling route information and guidance route information to the server apparatus 12 via the communication unit 26 for each trip between when an ignition switch of the vehicle 14 is turned on and when the ignition switch is turned off. In a case where route guidance is not performed by the navigation unit 22 during one trip, the processing unit 24 transmits the traveling route information solely. Information for identifying the vehicle 14 that is a transmission source is attached to information to be transmitted.

Figure 3:
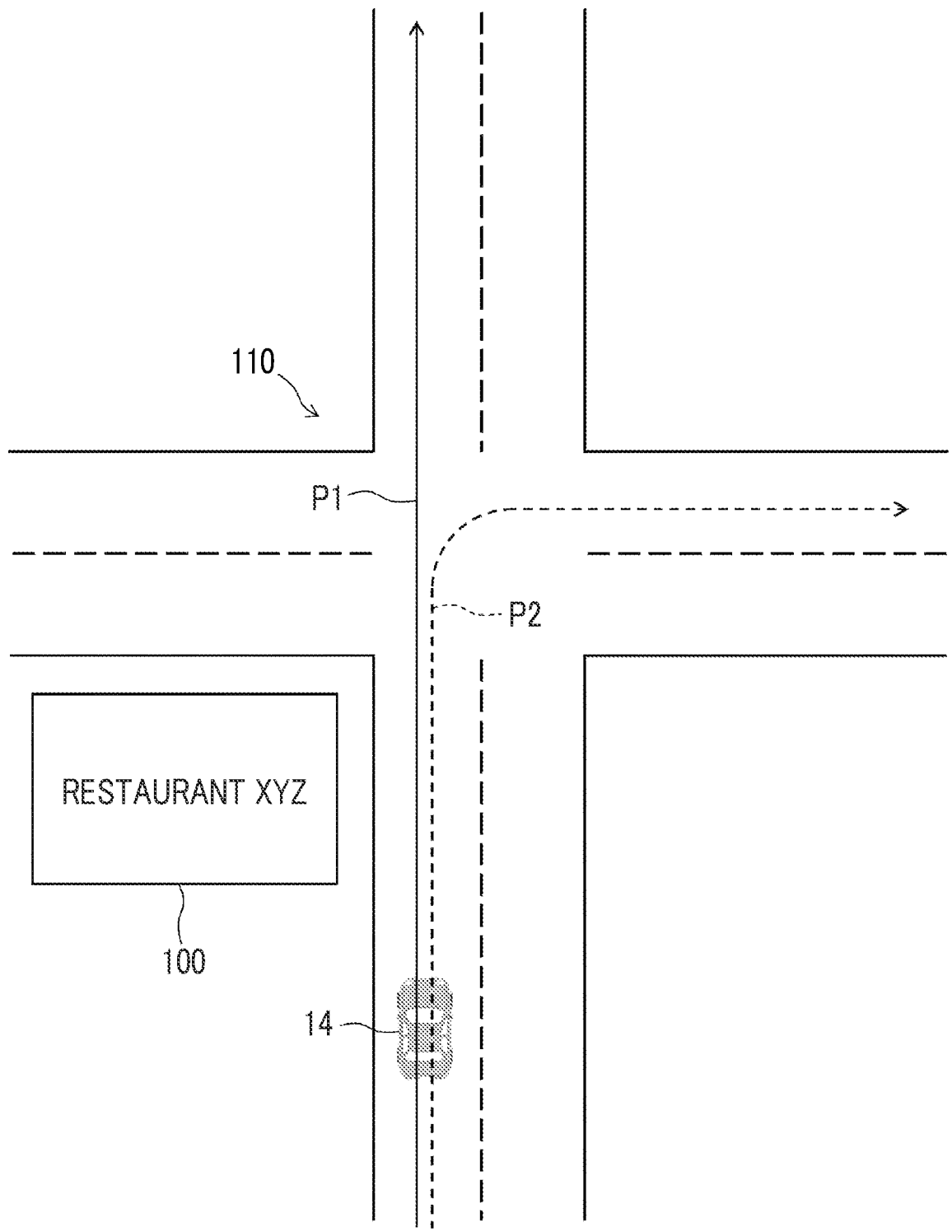
FIG. 3 is a view illustrating an example of the traveling route of a vehicle in FIG. 1 and a guidance route.

FIG. 3 illustrates an example of a traveling route P1 of the vehicle 14 in FIG. 1 and a guidance route P2. The guidance route P2 is a route that goes toward an intersection 110 from the south to the north and turns right at the intersection 110. It will be assumed that a building 100 of "restaurant XYZ" is present in the vicinity of the intersection 110 and the building 100 has been "convenience store ABC".

The navigation unit 22 stores traveling guidance information relating to each traveling direction for each point like an intersection where traveling guidance needs to be performed. The traveling guidance information includes information about a marker and information about voice guidance relating to the marker. Examples of the marker include a building such as a store, a signboard, a vacant land, a lane on a road, and a traffic sign.

It will be assumed that the change about the building 100 is not reflected on traveling guidance information in the case of the example shown in FIG. 3. For example, marker information with respect to the intersection in FIG. 3 includes "convenience store ABC" which is the name of a marker, the position of the marker, and an image simulating the marker in relation to a south-to-north traveling direction. Voice guidance information is, for example, information indicating that "the convenience store ABC is the marker".

In a case where the vehicle 14 reaches a point on a guidance route at which traveling guidance needs to be performed, the navigation unit 22 performs traveling guidance by means of a voice saying "Turn right after a while. The convenience store ABC is the marker." by using traveling guidance information relating to the intersection 110. At this time, the navigation unit 22 may display an enlarged view of the intersection 110 and display an image simulating the building of "convenience store ABC" at the position of the marker in the enlarged view. For the traveling guidance, a known technique can be used.

In the case of the example shown in FIG. 3, a marker included in traveling guidance is different from the actual situation and thus a driver who is given the traveling guidance cannot visually recognize the building of "convenience store ABC" in the vicinity of the intersection 110 where a right turn needs to be performed. Therefore, the driver drives straight without turning right at the intersection 110 where a right turn needs to be performed and thus the traveling route P1 deviates from the guidance route P2.

Referring again to FIG. 2, the imaging unit 28 is configured as a so-called drive recorder and includes a vehicle-mounted camera 30 and an image storage unit 32. The vehicle-mounted camera 30 consecutively captures images of a space in front of the vehicle 14. The image storage unit 32 stores a plurality of images captured by the vehicle-mounted camera 30. The date and time of capture is attached to each image. An image from among the images stored in the image storage unit 32 that is captured a certain period ago or more time ago is deleted. The certain period is set based on the storage capacity of the image storage unit 32. The imaging unit 28 is not particularly limited and may not be installed in the vehicle 14.

In the server apparatus 12, the communication unit 40 receives traveling route information and guidance route information from the vehicle-mounted device 10 of each of the vehicles 14 and outputs the received information to the third acquisition unit 64.

The third acquisition unit 64 acquires the traveling route information and the guidance route information output from the communication unit 40 and stores the acquired traveling route information and the acquired guidance route information in the first storage unit 46 in correlation with information for identifying the vehicles 14.

The processing unit 42 may delete traveling route information and guidance route information acquired a predetermined period ago or more time ago, which is a part of the stored traveling route information and guidance route information, from the first storage unit 46. The predetermined period is several days or several weeks and can be appropriately set through an experiment or the like.

The first acquisition unit 60 acquires a specific point at which the traveling route of the vehicle 14 deviates from a guidance route and conditions under which the traveling route deviates from the guidance route at the specific point, based on the traveling route information of the vehicles 14 and the guidance route information stored in the first storage unit 46. In the case of the example shown in FIG. 3, the specific point is the intersection 110. The conditions under which the traveling route deviates from the guidance route include at least one of a period of time of travel and weather, a traveling direction, and the like. The first acquisition unit 60 acquires the period of time of travel from the date and time of travel in the vicinity of the specific point which is included in the traveling route information. The period of time of travel may be divided into nighttime and non-nighttime and the non-nighttime may be divided into smaller periods of time. The first acquisition unit 60 acquires the weather in the vicinity of the specific point at the date and time of travel in the vicinity of the specific point, from another server apparatus (not shown) or the like.

The specifying unit 66 specifies the vehicle 14 that has passed through the specific point acquired by the first acquisition unit 60 and of which the traveling situation at the specific point satisfies the above-described conditions, based on the traveling route information of the vehicles 14 which is stored in the first storage unit 46. With regard to a condition relating to a period of time of travel, the vehicle 14 that has passed through the specific point at a period of time of travel of the condition is specified regardless of a date. With regard to a condition relating to weather, the specifying unit 66 acquires one or more sets of a date and a period of time, at which the weather in the vicinity of the specific point is weather of the condition, from another server apparatus or the like and specifies the vehicle 14 that has passed through the specific point at the acquired date and the acquired period of time, as the vehicle 14 that has passed through the specific point at the weather of the condition.

The specifying unit 66 specifies one or more vehicles 14 including the vehicle 14 of which the traveling route deviates from the guidance route. The specifying unit 66 may also specify the vehicle 14 that has traveled along the guidance route at the specific point and the vehicle 14 that has traveled at the specific point with the navigation unit 22 not performing route guidance. Since the vehicle 14 other than the vehicle 14 deviating from the guidance route is also specified, it is possible to increase a possibility that an image of the specific point can be acquired even in a case where the vehicle 14 deviating from the guidance route does not hold the image of the specific point. In addition, the specifying unit 66 specifies a date and time of passage through the specific point that satisfies the above-described conditions, for each of the specified vehicles 14.

The communication unit 40 transmits a transmission request for an image of the specific point to the vehicle 14 specified by the specifying unit 66. The transmission request is set for each specified vehicle 14 and includes information about a date and time specified by the specifying unit 66. Information for identifying the vehicle 14 that is a transmission destination is attached to the transmission request.

In a case where the communication unit 26 in the vehicle-mounted device 10 receives a transmission request for an image, the processing unit 24 confirms whether an image of a date and time included in the transmission request is stored in the image storage unit 32 or not.

In a case where the image of the date and time included in the transmission request is stored in the image storage unit 32, the processing unit 24 transmits the image (that is, image of specific point) to the server apparatus 12 via the communication unit 26. There may be a case where the image of the specific point has been deleted already and there may be a case where the image of the specific point has not been captured with the imaging unit 28 stopping to capture an image.

In the server apparatus 12, the communication unit 40 receives the image of the specific point that is transmitted from the specified vehicle 14 and outputs the received image to the second acquisition unit 62. The second acquisition unit 62 acquires the image of the specific point output from the communication unit 40. The above-described acquisition corresponds to the second acquisition unit 62 acquiring, from the specified vehicle 14, an image of the specific point captured by the vehicle 14. The second acquisition unit 62 outputs the acquired image of the specific point to the generation unit 68.

The generation unit 68 generates new traveling guidance information relating to the specific point based on the image of the specific point acquired by the second acquisition unit 62. In a case where a plurality of images of the specific point is acquired, the generation unit 68 performs a process with respect to any one of the images.

Specifically, the generation unit 68 specifies a marker used in current traveling guidance at the specific point by means of image recognition, from the image of the specific point. The second storage unit 48 stores the same traveling guidance information as the traveling guidance information stored in the navigation unit 22 of the vehicle 14. The marker used in the current traveling guidance can be specified from the traveling guidance information of the second storage unit 48. In a case where the current marker can be specified, the generation unit 68 terminates a process relating to the specific point. This is because that the reason why the traveling route deviates from the guidance route may not be that the marker is difficult to visually recognize in this case. Therefore, it is possible to suppress a needless change in marker.

In a case where the current marker cannot be specified from the image of the specific point, the generation unit 68 extracts a marker to be used in new traveling guidance from the image of the specific point by means of image recognition, specifies the name and the position of the extracted marker, and generates new traveling guidance information including information about the extracted marker based on the specified information. The new traveling guidance information is correlated with the conditions under which the traveling route deviates from the guidance route. The above-described process of the generation unit 68 can be performed by using a known image recognition technique.

In the case of the example shown in FIG. 3, since "convenience store ABC" cannot be specified from the image of the intersection 110, the generation unit 68 extracts the building 100 of "restaurant XYZ" which is a new marker and specifies "restaurant XYZ" which is the name of the marker and the position of the marker. The generation unit 68 generates marker information including "restaurant XYZ" which is the name of the marker, the position of the marker, and an image simulating the marker. The generation unit 68 generates voice guidance information indicating that "the restaurant XYZ is the marker".

The generation unit 68 updates the traveling guidance information relating to the specific point that is correlated with the conditions and is stored in the second storage unit 48, with the new traveling guidance information. The provision unit 70 provides the generated new traveling guidance information to the vehicles 14 via the communication unit 40.

In a case where the communication unit 26 of the vehicle-mounted device 10 receives the new traveling guidance information, the navigation unit 22 updates the existing traveling guidance information relating to the specific point that is correlated with the conditions, with the new traveling guidance information. Under the conditions correlated with the new traveling guidance information, the navigation unit 22 performs traveling guidance relating to the specific point by using marker information in the new traveling guidance information. In the case of the example shown in FIG. 3, the navigation unit 22 performs traveling guidance by using "restaurant XYZ" matching the actual situation as a marker. Since it is easy for a driver to visually recognize the new marker, the driver is less likely to mistake the traveling route at the specific point. As described above, in a case where a marker to be used in traveling guidance disappears, the traveling guidance can be performed by means of another marker.

In FIG. 3, an example where a building as a marker is changed has been described. However, the embodiment is also effective with respect to a marker that is difficult to see at a specific period of time while being easy to see in the daytime but difficult to see in the nighttime or the like or a marker that is difficult to see at specific weather while being easy to see at clear weather and difficult to see at rainy weather or the like. Since the vehicle 14 that has passed the specific point and of which the traveling situation satisfies the conditions is specified, in a case where a marker is difficult to see at at least one of a specific period of time and specific weather, traveling guidance can be performed by using another marker that can be image-recognized at the conditions, that is, another marker that is easy for a driver to visually recognize. In other words, it is possible to perform traveling guidance by using a different marker depending on conditions.

As another specific example, the embodiment is also effective in a situation where the number of lanes on a road at an intersection, at which an image simulating a plurality of lanes is displayed at the time of traveling guidance, has been changed due to construction work or the like and thus an image of lanes displayed at the time of traveling guidance is different from the actual situation. In this case, there is a possibility that a driver confirming the image of the lanes mistakenly recognizes that a lane on which the driver is driving is a lane for a right turn although the lane is a lane for advancing straight actually, a right turn cannot be performed at an intersection at which a right turn needs to be performed, and thus a traveling route deviates from a guidance route. In this case as well, new traveling guidance can be generated by updating the image of the lanes.

Note that, even in a case where a marker included in traveling guidance is different from the actual situation, the server apparatus 12 acquires no image and does not change traveling guidance when there is no vehicle 14 mistaking a traveling route due to the traveling guidance. In this case, there is a possibility that the traveling route is less likely to be mistaken due to some reasons such as a guidance mark or a signboard that indicates a destination on a road and is easy to understand. Therefore, it is needless to change the marker quickly and such a change can be suppressed.

The configurations of the vehicle-mounted device 10 and the processing unit 42 can be realized by means of a CPU of any computer, a memory, and other LSIs in terms of hardware and are realized by a program loaded in a memory in terms of software and functional blocks realized by a combination thereof have been described here. Therefore, it is understood by those skilled in the art that the functional blocks can be realized by in various forms by means of hardware, software, and a combination of hardware and software.

Figure 4:
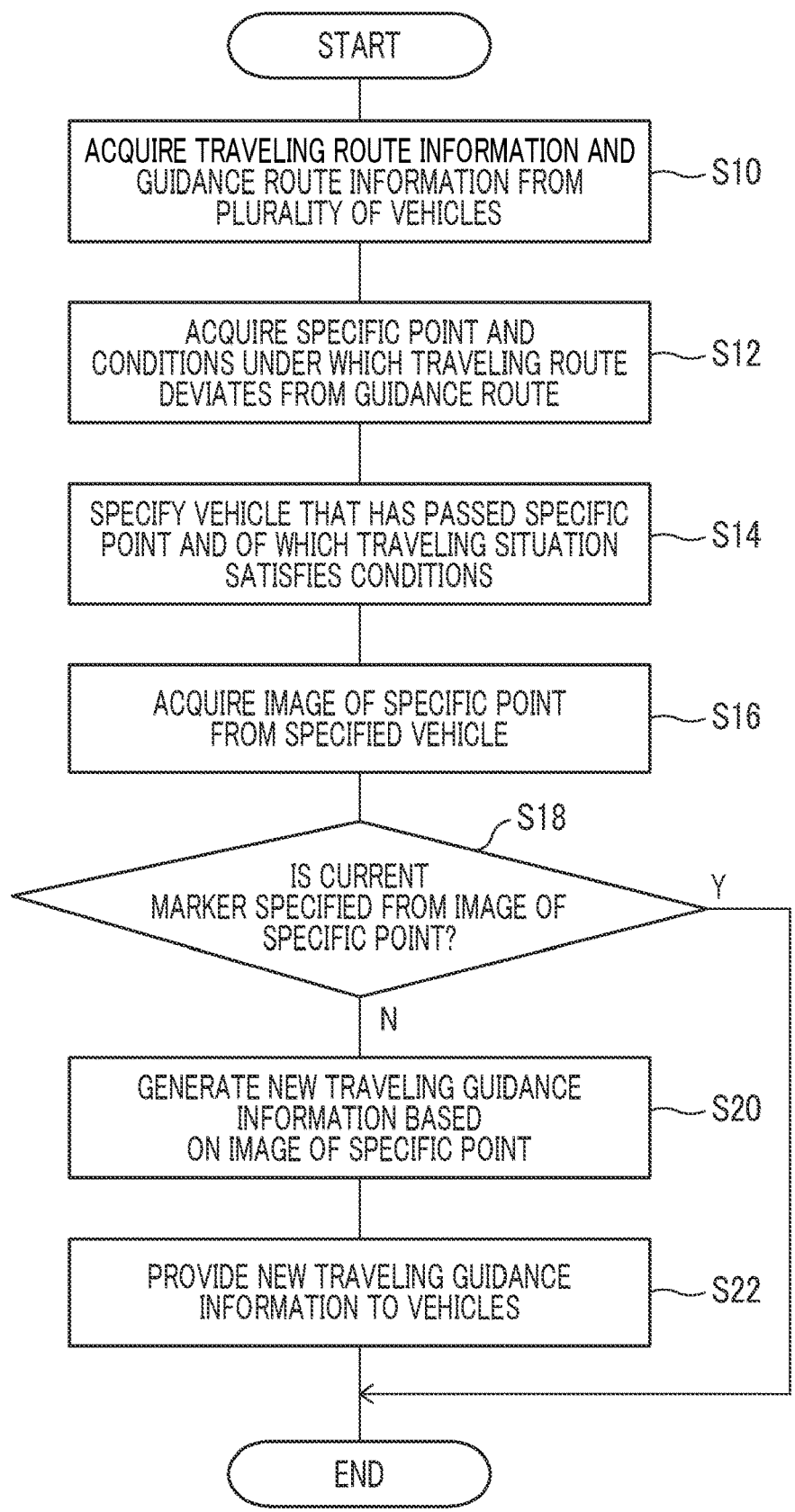
FIG. 4 is a flowchart illustrating a process performed by the server apparatus shown in FIG. 1.

Next, the overall operation of the vehicle system 1 as described above will be described. FIG. 4 is a flowchart illustrating a process performed by the server apparatus 12 in FIG. 1. The process in FIG. 4 is repeated periodically.

The third acquisition unit 64 acquires the traveling route information and the guidance route information from the vehicles 14 (510). The first acquisition unit 60 acquires the specific point and the conditions under which the traveling route deviates from the guidance route based on the acquired traveling route information and the acquired guidance route information (S12). The specifying unit 66 specifies the vehicle 14 that has passed the acquired specific point and of which the traveling situation at the specific point satisfies the conditions, based on the acquired traveling route information (S14).

The second acquisition unit 62 acquires an image of the specific point from the specified vehicle 14 (S16). In a case where the current marker is specified from the image of the specific point (Y in S18), the process is terminated. In a case where no current marker is specified (N in S18), the generation unit 68 generates new information for traveling guidance relating to the specific point based on the image of the specific point (S20). The provision unit 70 provides the generated new traveling guidance information to the vehicles 14 (S22) and the process is terminated.

According to the embodiment, since an image of a specific point at which the traveling route of the vehicle 14 deviates from a guidance route is acquired, it is possible to generate, based on the image, new information for traveling guidance that conforms to the actual situation and is less likely to be mistaken by a driver.

In addition, since the image of the specific point is acquired from the vehicle 14 that has passed through the specific point, it is possible to considerably reduce the volume of data of an image uploaded from the vehicle 14 to the server apparatus 12 in comparison with a case where all images are acquired from all of the vehicles 14. Since the image of the specific point is solely analyzed in the server apparatus 12, it is possible to reduce the calculation amount.

Hereinabove, the disclosure has been described based on the embodiment. The embodiment is intended to be illustrative only and it will be obvious to those skilled in the art that various modification examples of each constituent element and each processing process can be made and that such modification examples are also within the scope of the disclosure.

For example, the conditions under which the traveling route deviates from the guidance route at the specific point may not include a period of time of travel and weather. According to this modification example, in a case where traveling guidance at a specific point is changed in the same way regardless of a period of time and weather, it is possible to generate new traveling guidance information that is less likely to be mistaken by a driver, with a simpler process.

In a case where no imaging unit 28 is installed in the vehicle 14 or in a case where the imaging unit 28 has not captured an image during one trip, the processing unit 24 may transmit no traveling route information to the server apparatus 12 if route guidance by the navigation unit 22 has not been performed. This is because traveling route information in this case cannot be used for acquisition of a specific point and cannot be used for acquisition of an image of the specific point. According to this modification example, it is possible to reduce the volume of data of traveling route information uploaded from the vehicle 14 to the server apparatus 12 and to suppress needless transmission of an image transmission request from the server apparatus 12.

The provision unit 70 of the server apparatus 12 may provide an image of the specific point received from the vehicle 14 to the vehicles 14 and the navigation unit 22 of the vehicle 14 may perform traveling guidance by displaying the image of the specific point. According to this modification example, it is possible to acquire an image of the specific point that matches the actual situation and to display an image similar to a scene that driver visually recognizes from the vehicle 14. Therefore, it is possible to make a traveling route further less likely to be mistaken.

The processing unit 24 of the vehicle-mounted device 10 may acquire the specific point at which the traveling route deviates from the guidance route and transmit information about the acquired specific point to the server apparatus 12. The processing unit 24 transmits traveling route information in addition to the information about the specific point and transmits no guidance route information. According to this modification example, it is possible to improve the degree of freedom in configuring the vehicle system 1.

What is claimed is:

1. A vehicle comprising:
a processor configured to:
receive information for traveling guidance that is generated based on an image of a specific point, the image of the specific point being captured by another vehicle, and the specific point being a point at which a traveling route of a different vehicle deviates from a guidance route, wherein:
the another vehicle that has captured the image of the specific point is a vehicle that has passed through the specific point under a prescribed condition, and
the prescribed condition is set based on a condition under which the traveling route of the different vehicle deviates from the guidance route.

2. The vehicle according to claim 1, wherein
the information for traveling guidance includes identification of a marker that is extracted from the image of the specific point.

3. The vehicle according to claim 2, wherein
the marker extracted from the image of the specific point includes at least one of a building, a signboard, a vacant land, a lane on a road, and a traffic sign.

4. The vehicle according to claim 2, wherein
the information for traveling guidance includes voice guidance relating to the marker extracted from the image of the specific point.

5. The vehicle according to claim 1, wherein
the prescribed condition is at least one of a period of time of travel, weather, and a traveling direction.

6. The vehicle according to claim 1, wherein
the another vehicle that has captured the image of the specific point is a same vehicle as the different vehicle whose traveling direction has deviated from the guidance route at the specific point.

7. The vehicle according to claim 1, wherein
the another vehicle that has captured the image of the specific point is a separate vehicle from the different vehicle whose traveling direction has deviated from the guidance route at the specific point.

8. The vehicle according to claim 1, wherein
the another vehicle that has captured the image of the specific point is a plurality of vehicles that each have passed through the specific point and captured a respective image of the specific point.

9. The vehicle according to claim 1, wherein
the processor is configured to update existing navigation information relating to the specific point, with the received information for traveling guidance.

10. The vehicle according to claim 1, wherein
the processor is configured to update existing navigation information relating to the specific point correlated with the prescribed condition, with the received information for traveling guidance.

* * * * *